United States Patent [19]
Olds et al.

[11] Patent Number: 5,926,767
[45] Date of Patent: Jul. 20, 1999

[54] METHOD AND SYSTEM REESTABLISHING A TEMPORARILY INTERRUPTED DYNAMIC COMMUNICATION LINK UNDER INTERMITTENT FADE CONDITIONS

[75] Inventors: Keith Andrew Olds, Mesa; Michael J. Andresen, Apache Junction, both of Ariz.

[73] Assignee: Motorola, Inc., Schaumburg, Ill.

[21] Appl. No.: 08/773,294

[22] Filed: Dec. 26, 1996

[51] Int. Cl.[6] .............................. H04B 1/00; H04B 17/00
[52] U.S. Cl. .............................. 455/504; 455/10; 455/63; 455/67.3
[58] Field of Search ..................................... 455/504, 502, 455/506, 63, 67.1, 67.3, 446, 427, 10, 13.2, 13.1, 12.1, 65, 9, 500; 375/350, 346

[56] References Cited

U.S. PATENT DOCUMENTS

| | | | |
|---|---|---|---|
| 3,842,352 | 10/1974 | Cote | 455/504 |
| 5,020,056 | 5/1991 | Chennakeshu | 455/504 |
| 5,285,480 | 2/1994 | Chennakeshu et al. | 455/422 |
| 5,396,645 | 3/1995 | Huff | 455/444 |
| 5,574,984 | 11/1996 | Reed et al. | 455/504 |
| 5,634,206 | 5/1997 | Reed et al. | 455/504 |
| 5,794,123 | 8/1998 | Marston et al. | 455/63 |

*Primary Examiner*—Reinhard J. Eisenzopf
*Assistant Examiner*—Edan Orgad
*Attorney, Agent, or Firm*—Harold C. McGurk; Frank J. Bogacz

[57] ABSTRACT

In a dynamic communication system (90) wherein communication parameters vary between transmissions, subscriber units (200) are susceptible to intermittent link blockages. These blockages can result in a loss of successive feedback, instructing subscriber units (200) of adjustments to link parameters to be employed in a subsequent transmission on a communication link (105). Dynamic link parameters are predicted (240) continuously throughout intermittent link fades and these predictions are employed during link blockages in an attempt to re-establish communications. In addition, the subsequent resynchronization process resynchronizes the link parameter predicting model (240) based on how long the signal was interrupted.

25 Claims, 6 Drawing Sheets

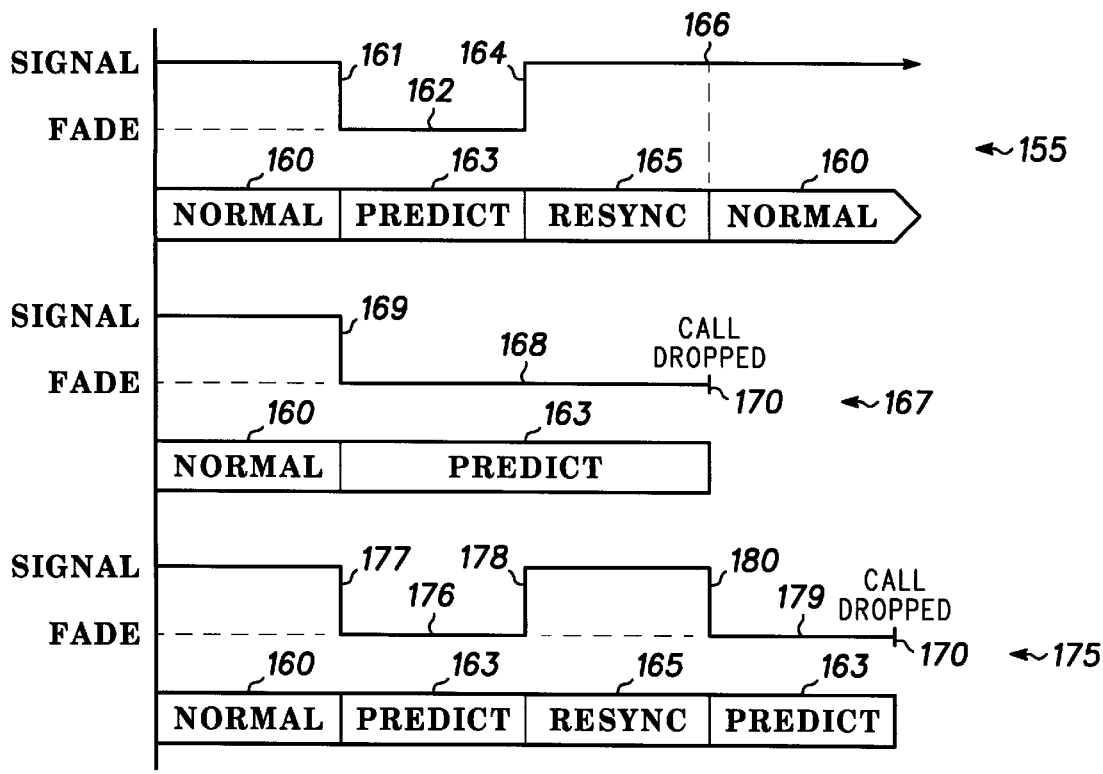
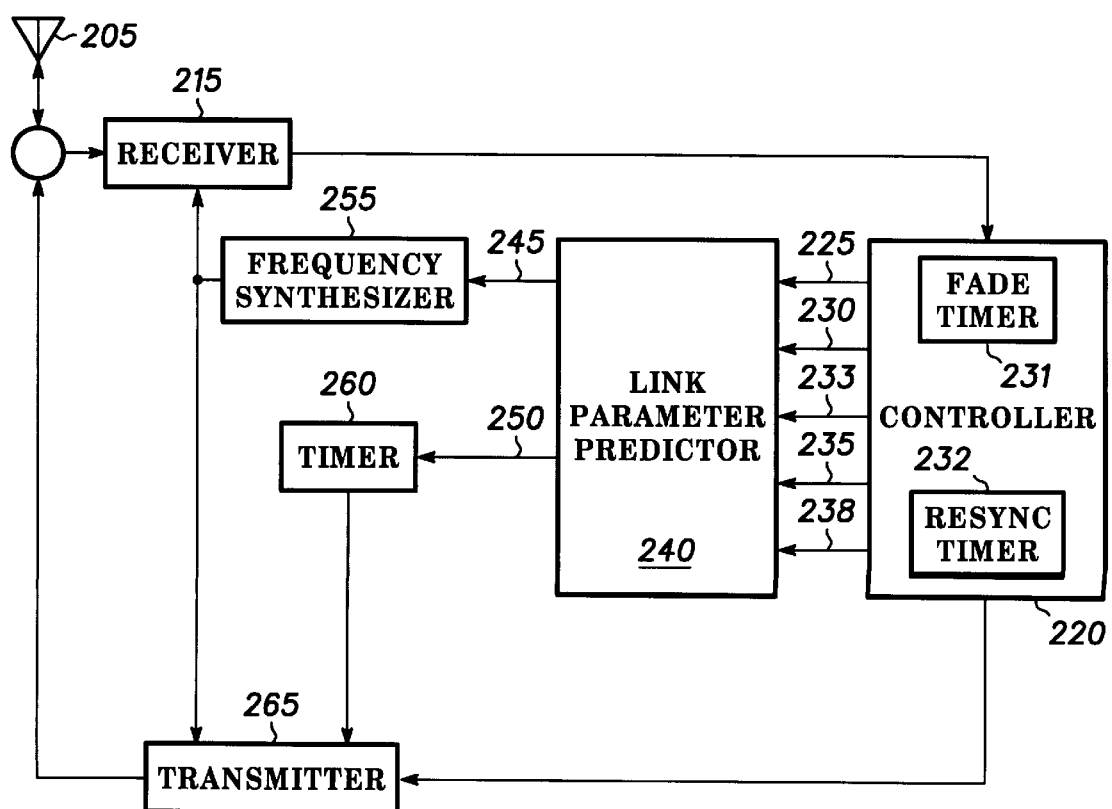

METHOD AND SYSTEM REESTABLISHING A TEMPORARILY INTERRUPTED DYNAMIC COMMUNICATION LINK UNDER INTERMITTENT FADE CONDITIONS

RELATED INVENTIONS

The present invention is related to the following invention and is assigned to the same assignee as the present invention:

(1) Method and Parameter Prediction System for Reestablishing a Temporarily Interrupted Dynamic Communication Link, Ser. No. 08/498,257.

FIELD OF THE INVENTION

This invention relates generally to the field of radio communications, and more particularly, to conducting a call using intermittently fading communication links.

BACKGROUND OF THE INVENTION

In telecommunication systems, links are established between nodes of a system for conveying information. Efficient use of these links requires enforcement of communication parameters defining when nodes at each end of a link anticipate information from the other unit. These parameters, in efficient bandwidth systems, comply with extremely tight tolerances to maximize information exchange. These parameters may include propagation delays between nodes of a network and transmit frequencies combined with path-introduced frequency errors, such as Doppler frequency shifts. As the communication parameters become more predictable and precise, guardbands on communication channels, such as frequencies and timeslots, can be reduced to accommodate exchange of additional information.

In conventional static or lightly dynamic telecommunication networks, these communication parameters may be refined upon the establishment of a communication link and relied upon throughout a communication session. However, in a dynamic communication system where these communication parameters are rapidly changing, communicating nodes such as subscriber units continually refine and update these communication parameters in order to maintain the prescribed tolerances of the system.

Conventional systems evaluate each transmission employing dynamic communication parameters to determine the precision of the employed parameters. When the parameters exceed threshold values, as defined by system specifications such as channelized communication frequencies or timeslots, the receiving system informs the transmitting node of correction values which bring the communication parameters into compliance with system requirements.

This approach is suitable when established communication links are not susceptible to transient effects, such as temporary fades due to obstructions or fleeting interference. However, in dynamic communication systems where communication parameters are short-lived, even brief fades of communication links cause communication parameters to become stale and ineffective when utilized following communication link fades. A receiving system will not recognize a node such as a subscriber unit, that employs out-dated communication parameters, due to the precise tolerances of channelized communication systems. When a subscriber unit is not recognized, the communication link will be terminated. Since most fades are of relatively short duration, the decision to drop the communication channel every time a fade occurs is undesirable. On the other hand, a subscriber unit should not be allowed to operate out of synchronization with its assigned channel because the resulting signal could interfere with one or more other channels.

Consequently, a process to predict dynamic communication parameters continuously throughout brief fades becomes desirable. This process would ensure that a subscriber unit will have revised its communication parameters to comply with the current system dynamics when the fade terminates. Following these brief fades, the system can be resynchronized. During this resynchronization process, the communication link could experience additional fades. Unfortunately, if resynchronization is not complete prior to additional fades, a channel may be dropped even though communication is otherwise able to proceed.

Accordingly, in addition to predicting dynamic communication parameters continuously throughout intermittent changes, there is a significant need for a method that improves the resynchronization process based on outage characteristics, so that a channel will not be erroneously dropped.

BRIEF DESCRIPTION OF THE DRAWINGS

FIG. 2 depicts state diagrams of various situations that can occur for an intermittently fading communication link;

FIG. 3 depicts a block diagram of subscriber unit in a dynamic communication system;

DETAILED DESCRIPTION OF THE DRAWINGS

The present invention has utility in immediately resuming communication services upon multiple fades of a communication link between a base station and a subscriber unit, in a communication system wherein the base station and the subscriber unit are dynamically oriented. In a satellite communication system, the dynamic orientation would be due to the orbiting nature of the satellite in relationship to the Earth-bound or near Earth-bound subscriber unit.

Figure 1:
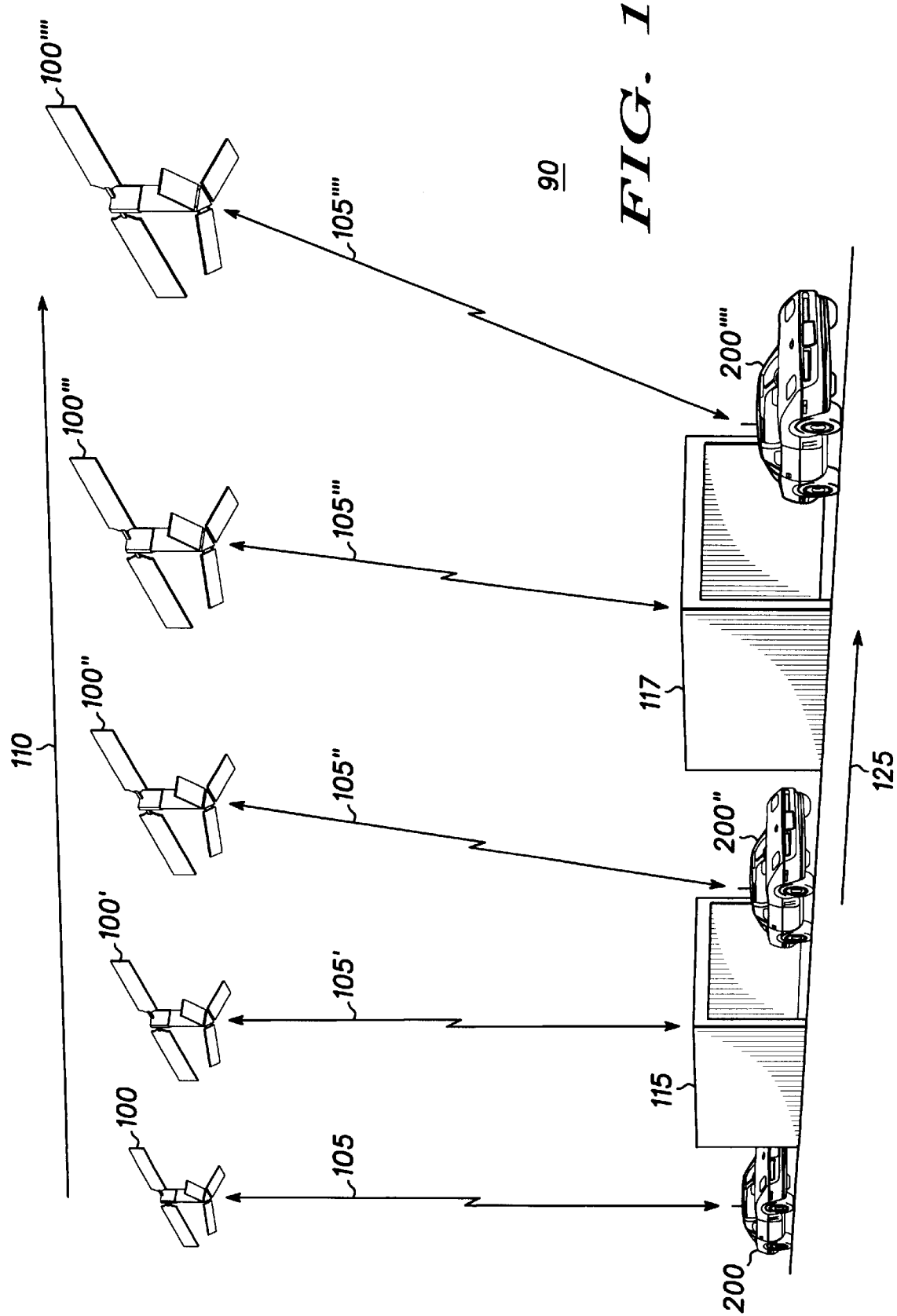
FIG. 1 depicts a highly simplified diagram of a dynamic communication system.

FIG. 1 depicts a highly simplified diagram of a dynamic communication system. A dynamic communication system 90 has components or nodes that are dynamically oriented, such that distances and velocities are changing between the nodes. In FIG. 1, dynamic communication system 90 is shown as an orbiting satellite-based system where satellite 100 represents one of the communication nodes or base stations, and in the preferred embodiment is space-born. It is also practical that dynamic communication system 90 could have airborne nodes or even that nodes could be Earth bound but still in motion with respect to other nodes. Subscriber unit 200 forms the other end of communication link 105 in dynamic communication system 90.

The motion or dynamics between nodes gives rise to dynamic link parameters for effective and efficient communication. Satellite 100 orbits the Earth in satellite orbit 110. The term "satellite" is intended to include orbiting satellites such as low Earth orbiting (LEO) satellites, medium-Earth orbiting inclined orbit (MEO) satellites, or highly-inclined orbit (HIO) satellites.

Satellite 100 in satellite orbit 110 may, for example, orbit the Earth at an altitude of around 780 km in a LEO system. This low-Earth orbit translates into a velocity with respect to the Earth of around 25,000 km/hr. Such a velocity allows satellite 100 to be in view of a terrestrial node, such as subscriber unit 200, for a duration of only around nine minutes. This velocity creates very dynamic communication parameters such as Doppler frequency shift and propagation delay or timing. With such a variation on communication parameters, subscriber unit 200 must frequently revise its communication parameters to comply with the system timing as expected by satellite 100.

In order to establish communication link 105, subscriber unit 200 uses default or initial communication parameters. These parameters may either be pre-programmed into subscriber unit 200 or they may be derived by observing link 105.

Subscriber unit 200 uses default or estimated link parameters as an approximation to actual link parameters. This transmission to satellite 100 occurs generally on a secondary or acquisition channel having a much lower bandwidth and broader tolerances for both frequency and time variations. Satellite 100 evaluates the transmission by subscriber unit 200, which employed default link parameters. In a subsequent transmission to subscriber unit 200, satellite 100 returns the result of this evaluation to subscriber unit 200 in the form of feedback link parameters denoting necessary adjustments to the default link parameters. In the preferred embodiment, these feedback communication parameters are frequency-of-arrival (FOA) raw parameter 225 (FIG. 3) and time-of-arrival (TOA) raw parameter 230 (FIG. 3). These parameters denote a differential value of the expected frequency and timing received at satellite 100 and the actual measured values at satellite 100. Subscriber unit 200 revises the default communication parameters according to the feedback information. In subsequent transmissions to satellite 100, subscriber unit 200 employs the revised communication parameters. This refining process repeats until dynamic communication parameters have been sufficiently refined to enable non-interfering transmission on a narrow-band channel. Satellite 100 then directs subscriber unit 200 to a traffic channel and establishment of communication link 105 is complete.

FIG. 1 also depicts satellite 100 in motion with respect to subscriber unit 200 and the potential for more than one outage of communication link 105. At a first point in time, satellite 100 and subscriber unit 200 are shown to have an active established communication link 105. As subscriber unit 200, traveling in subscriber unit direction of travel 125, passes by or through obstruction 115, communication link 105' between satellite 100' and subscriber unit 200' (not shown) experiences a fade. The term "fade" denotes a signal outage when compared to a specified threshold value. In other words, a fade occurs when a communication signal deteriorates beyond the point where feedback link parameters can be communicated between satellite 100 and subscriber unit 200. When subscriber unit 200" emerges from obstruction 115, satellite 100", in satellite orbit 110 has substantially changed its orientation in relation to subscriber unit 200". Similarly, as subscriber unit 200", traveling in subscriber unit direction of travel 125, passes by or through obstruction 117, communication link 105''' between satellite 100''' and subscriber unit 200''' (not shown) experiences another fade. When subscriber unit 200'''' emerges from obstruction 117, satellite 100'''', in satellite orbit 110, has substantially changed its orientation in relation to subscriber unit 200''''.

If obstruction 115 obscures communication link 105 for even a second in a narrow-band LEO satellite communication system, employment by subscriber unit 200" of the dynamic link parameters utilized at the locations of satellite 100 and subscriber unit 200, would be out of the tolerances required by communication link 105". Likewise, if obstruction 117 obscures communication link 105''' for as little as a second in a narrow-band LEO satellite communication system, employment by subscriber unit 200'''' of the dynamic link parameters utilized at the locations of satellite 100" and subscriber unit 200", would be out of the tolerances required by communication link 105''''.

In addition, if obstruction 117 obscures communication link 105" prior to complete resynchronization of communication link 105", a call being conveyed through the dynamic communication system 90 may be dropped. The need for revising and predicting dynamic link parameters in an efficient manner becomes apparent as subscriber unit 200 operates in an urban environment around obstructions such as buildings, highway underpasses, bridges, and dense foliage. It will be readily apparent to those skilled in the art that in an environment of multiple obstructions, communication link 105 may experience multiple fades of varying lengths during which limited opportunity will be provided for resynchronization of communication link 105.

FIG. 2 depicts state diagrams of some of various situations that can occur for an intermittently fading communication link, such as communication link 105 (FIG. 1). Three independent situations are illustrated, each situation beginning with a normal call taking place over a communication link. Those skilled in the art will appreciate that these three situations do not exhaust all possible situations which may occur for an intermittently fading link.

A state diagram 155 illustrates a situation where a communication link 105 has been established between subscriber unit 200 and satellite 100 (FIG. 1). At that point, the system is in a normal operating (NORMAL) mode 160. At a point in time 161, a single fade 162 occurs. During fade 162, subscriber unit 200 operates in a prediction (PREDICT) mode 163 and predicts the dynamic link parameters. Fade 162 ends when the signal returns at a point in time 164. Following signal return, subscriber unit 200 enters a resynchronization (RESYNC) mode 165. During resynchronization mode 165, communication link 105 is active and communications may continue based on instantaneous, unfiltered, dynamic link parameters. In addition, during resynchronization mode 165, subscriber unit 200 initializes a filter (discussed below) for the dynamic link parameters. After resynchronization is complete, at a point in time 166 communication link 105 will be fully achieved and system 90 will return to normal operating mode 160 until the call is complete or another fade occurs.

A state diagram 167 illustrates a situation beginning with communication link 105 being established between subscriber unit 200 and satellite 100, and subscriber unit 200 operating in normal operating mode 160. A single fade 168 occurs at a point in time 169. During fade 168, subscriber unit 200 operates in prediction mode 163 to predict the dynamic link parameters. However, fade 168 does not end within a predetermined duration and the call is dropped at a point in time 170.

A state diagram 175 illustrates a more complicated scenario of more than one fade and the resulting action of subscriber unit 200. Such a situation might be encountered by a subscriber unit 200 driving past an industrial complex while operating with a satellite 100 at a relatively low elevation angle. State diagram 175 begins with communication link 105 being established between subscriber unit 200 and satellite 100, and subscriber unit 200 in normal operating mode 160. A first fade 176 occurs at a point in time 177. Subscriber unit 200 operates in prediction mode 163 and predicts the dynamic link parameters until the signal returns which occurs at a point in time 178. Once the signal returns, subscriber unit 200 enters resynchronization mode 165. While in resynchronization mode 165, a second fade 179 occurs at a point in time 180, and subscriber unit 200 re-enters prediction mode 163. If the resynchronization interval is too short, this occurrence could result in the call being dropped, and the channel being made available for use in other calls, even though the disruption of communication is fairly minor. The same thing could happen if subscriber unit 200 encountered a longer series of short fades.

FIG. 3 depicts a block diagram of subscriber unit 200 in dynamic communication system 90 (FIG. 1). A receiver 215 receives the communication link 105 through an antenna 205. A receiver 215 buffers received transmissions from satellite 100, such as broadcast channel information, acquisition channel information, and information on communication link 105.

A controller 220 receives the buffered information from receiver 215. Controller 220 parses this information to extract default or feedback link parameters from the received signal. In a preferred embodiment, dynamic link parameters are comprised of frequency and timing or propagation parameters. Controller 220 sends FOA instantaneous or raw parameter 225 and TOA instantaneous or raw parameter 230 to a link parameter predictor 240. Controller 220 also evaluates the status of communication link 105 (FIG. 1) and initiates a fade duration timer (FADE TIMER) 231 and a resynchronization duration timer (RESYNC TIMER) 232, in response to the status of communication link 105, Controller 220 generates link detect status 235 denoting whether a fade is underway and starting values 233 for use by link parameter predictor 240 in fade duration dependency functions (discussed below).

During the acquisition process for establishing a communication link, unfiltered, feedback link parameters are employed in transmissions to "pull" timing and frequency of subscriber unit transmissions into compliance with tight tolerances of the traffic channels of communication link 105. The use of unfiltered, feedback link parameters allows subscriber unit 200 to quickly adjust link parameters in gross steps as compared with finer predicted incremental values capable from a vector filter (discussed below) used by link parameter predictor 240. During this "pulling-in" phase, controller 220 de-activates synchronization complete status 238 to inform link parameter predictor 240 to bypass the vector filter and supply only unfiltered feedback link parameters.

Link parameter predictor 240 receives the link parameter signals, status signals, and timing signal and processes them to generate predicted frequency parameter 245 and predicted timing parameter 250. These signals inform a frequency synthesizer 255 and a timer 260 of the transmission characteristics desired, so that information transmitted by transmitter 265 of subscriber unit 200 can be successfully received at satellite 100 over communication link 105.

Figure 4:
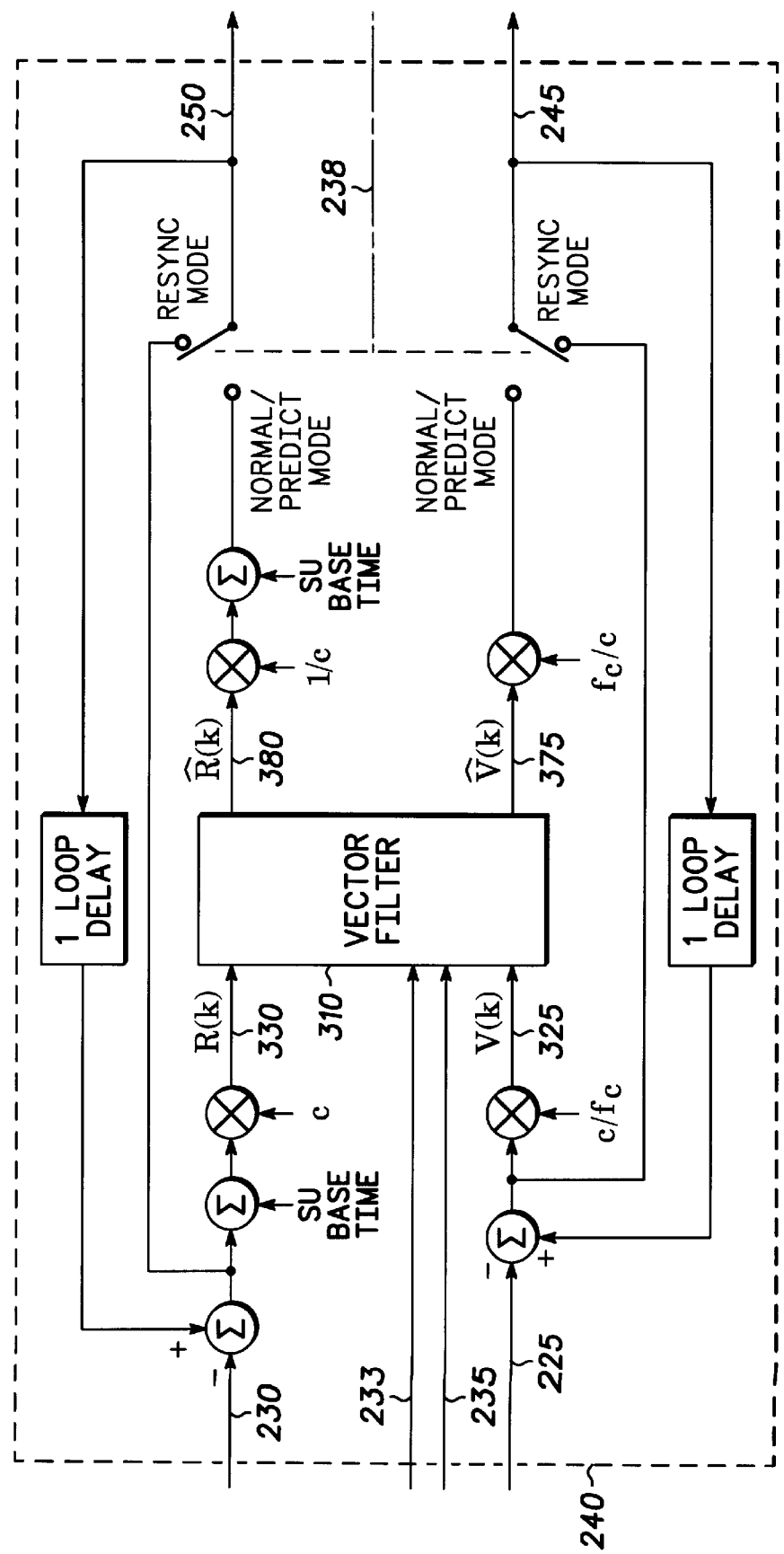
FIG. 4 depicts a block diagram of a communication parameter predictor for a subscriber unit.

FIG. 4 depicts a block diagram of link parameter predictor 240 for subscriber unit 200. Link parameter predictor 240 improves the performance of subscriber unit 200 by providing a smoothing and predicting vector filter 310. Vector filter 310 acts upon range measurements (R(k)) 330 and velocity measurements (V(k)) 325 and produces smoothed estimates of the range and velocity of satellite 100 relative to subscriber unit 200.

Frequency-of-arrival raw parameter 225 and time-of arrival raw parameter 230 are converted to range and velocity measurements in link parameter predictor 240 for use by vector filter 310. A subscriber unit base time defines a reference from which subscriber unit transmission and reception timing are based. Both the speed of light, c, and this base time are used in converting time-of-arrival parameters to and from range parameters. Smoothed and predicted range estimate 380 and predicted velocity estimate 375 are converted back to predicted frequency parameter 245 and predicted timing parameter 250 for use by frequency synthesizer 255 (FIG. 3) and timer 260 (FIG. 3).

FIG. 4 also shows the bypass switching of vector filter 310 as controlled by synchronization complete status 238 during the synchronization "pull-in" phase, as described above in FIG. 3, for establishing communication link 105 (FIG. 1). During initial synchronization or subsequent resynchronizations, link parameter predictor 240 operates with vector filter 310 out of the loop (RESYNC MODE). At this point in the operation, the use of a smoothing filter is pointless. After "pull-in" is achieved and the mode is switched from resynchronization mode 165 to normal operating mode 160 or prediction mode 163, vector filter 310 is switched on (NORMAL/PREDICT MODE), provided sufficient raw measurements have been made to initialize the state vector of vector filter 310. Initialization of vector filter 310 is discussed in FIGS. 5 and 6. The structure of link parameter predictor 240 converts TOA raw parameter 230 (FIG. 3) and FOA raw parameter 225 (FIG. 3) into a raw range parameter 330 and a raw velocity parameter 325, and both are input to vector filter 310 as a 2×1 matrix.

Figure 5:
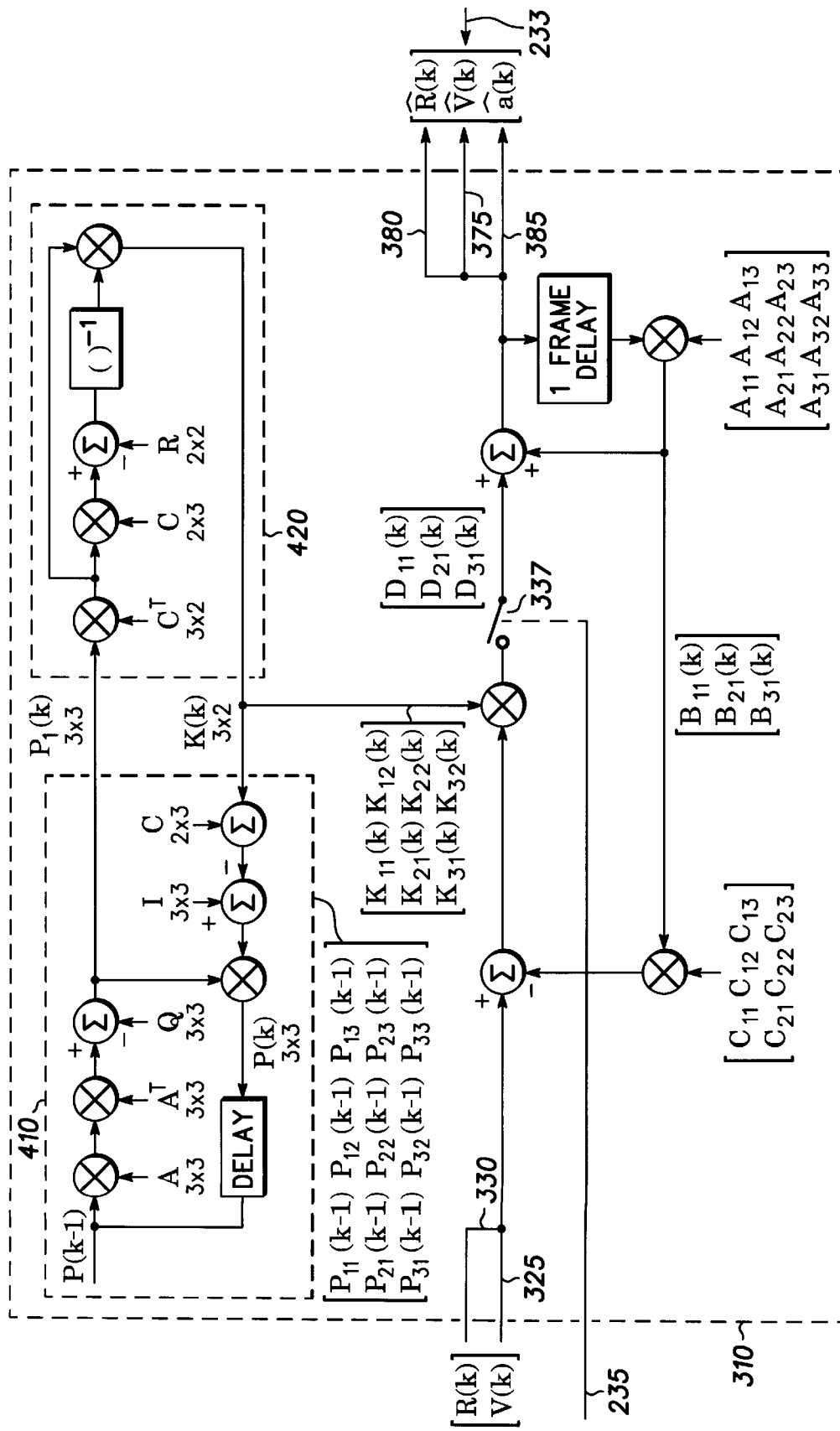
FIG. 5 depicts a block diagram of a vector filter for a communication parameter predictor.

FIG. 5 depicts a block diagram of vector filter 310 used in link parameter predictor 240. A preferred embodiment of vector filter 310 is shown as a three-state Kalman filter. Other numbers of states may be implemented for increased accuracy. In vector filter 310, acceleration is the third state and the dynamically random process is now the rate of change of acceleration. Other filters that could be considered to further improve performance would be four or more states or an extended Kalman filter.

The design of a filter considers both a model for the physical process and a model for the observation process. The physical process model is selected to incorporate as much information as possible about relationships between range, range-rate, range-rate rate, etc. The more sophisticated the model, the more complex the filter and the better the tracking results. The observation model is based upon the measurements available to the system and the noise process that is corrupting these measurements.

For a vector filter, the physical process model expressed as a first order vector dynamical equation is:

$$x(k+1)=Ax(k)+w(k)$$

where w(k) is the physical model noise process. Its covariance matrix is defined by:

$$Q(k)\ E\{w(k)\ w^T(k)\}$$

The observation model is given by:

$$y(k)=Cx(k)+z(k),$$

where z(k) is the measurement noise process. The measurement noise covariance matrix is defined by:

$$R(k)=E\{z(k)z^T(k)\}$$

The Kalman filter estimator of x(k) given its previous value, x(k−1), is given by:

$$x(k)=Ax(k-1)+K(k)[y(k)-CAx(k-1)]$$

where the gain matrix is:

$$K(k)=P_1(k)C^T[CP_1(k)C^T+R(k)]^{-1}$$

where, $$P_1(k)=AP(k-1)A^T+Q(k-1)$$

$$P(k)=P_1(k)-K(k)C(k)P_1(k)$$

The discrete time difference equation for acceleration is found by expressing the acceleration at time (k+1)T as the acceleration at time kT plus T times the acceleration rate of change. Mathematically the radial acceleration, a(k) is:

$$a(k+1)=a(k)+Ta'(k)$$

where,
a'(k) is the rate of change of radial acceleration at time kT. Integrating acceleration to find velocity, v(k):

$$v(k+1)=v(k)+Ta(k)+(T^2/2)a'(k)$$

Integrating again to find slant range, r(k):

$$r(k+1)=r(k)+Tv(k)+(T^2/2)a(k)+(T^3/6)a'(k)$$

Defining x(k) as slant range, r(k), velocity, v(k), and radial acceleration at time kT, a(k) as a 3×1 x matrix for this implementation:

$$x(k) = \begin{bmatrix} r(k) \\ v(k) \\ a(k) \end{bmatrix} = \begin{bmatrix} x_1(k) \\ x_2(k) \\ x_3(k) \end{bmatrix}$$

$$x_1(k+1) = x_1(k) + Tx_2(k) + \frac{T^2}{2}x_3(k) + \frac{T^3}{6}a'(k)$$

$$x_2(k+1) = x_2(k) + Tx_3(k) + \frac{T^2}{2}a'(k)$$

$$x_3(k+1) = x_3(k) + Ta'(k)$$

$$x_3(k+1)=x_3(k)+Ta'(k)$$

Expressed in matrix notation:

$$x(k+1) = \begin{bmatrix} 1 & T & T^2/2 \\ 0 & 1 & T \\ 0 & 0 & 1 \end{bmatrix} x(k) + \begin{bmatrix} T^3/6 \\ T^2/2 \\ T \end{bmatrix} a'(k)$$

which is the first order vector equation. Hence, $$A = \begin{bmatrix} 1 & T & T^2/2 \\ 0 & 1 & T \\ 0 & 0 & 1 \end{bmatrix}; \text{ and } w(k) = \begin{bmatrix} T^3/6 \\ T^2/2 \\ T \end{bmatrix} a'(k)$$

Since independent observations of range and velocity are made via the time and frequency tracking loops, respectively, the observation equation is:

$$y(k) = \begin{bmatrix} 1 & 0 & 0 \\ 0 & 1 & 0 \end{bmatrix} x(k) + z(k)$$

which defines the 2×3 C matrix for this implementation.

$$C = \begin{bmatrix} 1 & 0 & 0 \\ 0 & 1 & 0 \end{bmatrix}$$

As mentioned above, link parameter predictor 240 converts TOA raw parameter 230 (FIG. 3) and FOA raw parameter 225 (FIG. 3) into a raw range parameter 330 and a raw velocity parameter 325 and are input to vector filter 310 as a 2×1 matrix. A feedback path is added to the input and multiplied by the 3×2 gain matrix K. The result is a 3×1 matrix denoted by D. The 3×1 matrix B is added to D to yield the output state variable 3×1 matrix, which is the filtered or smoothed estimate of range, velocity and acceleration. The B and D matrices are storage medium and do not appear directly in the vector filter equations.

Link parameter predictor 240 and its inclusive vector filter 310 must operate through periods of time when no data is available for input but an updated estimate is still needed for the tracking loop. This occurs routinely when coasting in-between maintenance bursts containing feedback link parameters or sporadically when communication link 105 fades occur. The availability of a measurement can be determined by link detect status 235. When available, vector filter 310 operates closed loop and all covariance matrices are updated. When no data is available, feedback tap 337 from the loop gain matrix is opened, the gain matrix and covariance matrices are not updated, and the estimate is formed from only the geometric matrix A and the previous state variable matrix.

Since the state variables are updated at each burst transmission while the gain and covariance matrices are updated at one fourth that rate in the preferred embodiment, two A matrices are maintained. The matrix for the state variable calculations is designated as A1 and is given by:

$$A1 = \begin{bmatrix} 1 & T_1 & T_1^2/2 \\ 0 & 1 & T_1 \\ 0 & 0 & 1 \end{bmatrix}$$

The matrix for the gain and covariance matrix calculations is computed for a four frame interval. It is designated as matrix A4 and is given by:

$$A4 = \begin{bmatrix} 1 & T_4 & T_4^2/2 \\ 0 & 1 & T_4 \\ 0 & 0 & 1 \end{bmatrix}$$

Gain Matrix and Error Covariance Matrix Computation

The procedure for computing the error covariance matrices, P and P1, of an error covariance matrix computation block 410 is discussed below. The first time the loop is executed, starting values for the P matrix, P(O), are made available from controller 220 (FIG. 3). The starting values used are discussed in a later section. From this, P1(1) is computed. The gain matrix, K(1), of a gain matrix computation block 420 is then computed and used in the filter loop of vector filter 310 to update the state variable estimates. The gain matrix is also used to update the P matrix, P(1), which is stored until the next time the loop is executed.

Upon subsequent executions of the loop, the previous value of P(k) is used in the $P_1(k)$ and K(k) computation rather than the initial value matrix. However, if it is determined by subscriber unit 200 that a fade has occurred then the P matrix will be set back to a starting value matrix determined in a manner discussed below in connection with FIG. 6. This allows resynchronization of the error variances back to the starting values and increases the loop gain to facilitate rapid reacquisition of the uplink from subscriber unit 200 to satellite 100.

Subscriber unit 200 also sets the state vector to starting values 233 after a fade. Starting values are determined by feedback link parameters after communication link 105 is re-established and are dependent on fade duration in a manner discussed below in connection with FIG. 6.

A simplification of the P matrix computation is shown implemented in error covariance matrix computation block 410 and is defined by substituting the values for the C matrix and factoring $P_1$ from the equation:

$$P(k) = P_1(k) - K(k)C(k)P_1(k)$$

$$= [I - K(k)C(k)]P_1(k)$$

$$= \begin{bmatrix} 1-k_{11}(k) & k_{12}(k) & 0 \\ k_{21}(k) & 1-k_{22}(k) & 0 \\ k_{31}(k) & k_{32}(k) & 1 \end{bmatrix} P_1(k)$$

As the P matrix is iterated over and over again, its entries will stabilize to their steady state values. The entries in the P matrix change from their starting error variances of the estimates to their final values in a predictable and consistent manner.

Gain matrix computation block 420 is responsible for the K matrix. The K matrix is computed from the P1 matrix and the other constants C and R. The dimensionality of each matrix used in the computation is also shown. Even though a 3-state filter is implemented in the preferred embodiment, the inverse function acts on only a 2×2 matrix. As vector filter 310 is iterated, the filter gains approach their steady state values.

Measurement Noise Covariance Matrix

The measurement noise, z(k), is defined as:

$$z(k) = \begin{bmatrix} z_1(k) \\ z_2(k) \end{bmatrix} = \begin{bmatrix} \text{Range-Measurement-Noise} \\ \text{Velocity-Measurement-Noise} \end{bmatrix}$$

The range and velocity measurements are derived directly from the TOA raw parameter 230 (FIG. 3) and FOA raw parameter 225 (FIG. 3) respectively. Since the variances of TOA raw parameter 230 and FOA raw parameter 225 are known, the range and velocity variances can be determined. The measurement processes are mean zero (i.e., no bias error), and hence the variance=$E\{z_i^2(k)\}$ which is what is needed to define terms in the R matrix.

In the preferred embodiment, FOA raw parameter 225 standard deviation is:

$s_f$=31.97 Hz at 4.1 dB Eb/No

Hence, $s_v = s_f(c/f_c) = 31.97\{(3 \times 10^8)/(1625 \times 10^6)\} = 5.9 \text{m/s}$ and, $s_v^2 = 34.84 \text{ m}^2/\text{s}^2$ Likewise, TOA raw parameter 230 standard deviation is:

$s_t$=0.0028 ms at 4.1 dB Eb/No

Hence, $s_r = (c)(s_t) = (3 \times 10^8)(0.0028 \times 10^{-3}) = 840.0 m$ and, $s_r^2 = 705,600 \text{ m}^2$ The off diagonal terms are the cross-correlations between the range and velocity measurements. These measurement errors are considered uncorrelated for the following reasons:

(i) Under static conditions, TOA raw parameter 230 is a more robust measurement than FOA raw parameter 225. It has a very small standard deviation over it's operating signal-to-noise ratio where FOA raw parameter 225 has a much broader range;

(ii) Under real orbital conditions, TOA raw parameter 230 and FOA raw parameter 225 processes are not stressed at the same time. TOA raw parameter 230 has large error values at low elevation angles where radial velocity is maximum and acceleration is minimum, and FOA raw parameter 225 has large error values at high elevation angles where radial acceleration is maximum and velocity is minimum: and (iii) Under link blockage or fading conditions, no FOA raw parameter 225 and TOA raw parameter 230 updates are made to vector filter 310 (or the tracking loop for that matter) so correlated error under this condition is not a consideration.

The R matrix for this filter implementation is:

$$R(k) = E\{z(k)z^T(k)\}$$

$$= \begin{bmatrix} E\{z_1^2(k)\} & E\{z_1(k)z_2(k)\} \\ E\{z_2(k)z_1(k)\} & E\{z_2^2(k)\} \end{bmatrix}$$

Process Noise Covariance Matrix

Filter development relies on the modeling of radial acceleration. The true behavior of the acceleration is that it is near zero when satellite 100 is viewed at a low elevation angle and is some maximum negative value at zenith (satellite 100 has slowed down relative to subscriber unit 200). The magnitude of the acceleration then reduces back to zero as the elevation angle decreases back to zero. Non-overhead passes have a similar profile without the maximum acceleration magnitude being reached. The acceleration from one transmission from subscriber unit 200 to the next will have significant correlation as the acceleration is a slow varying process. However, vehicular motion of subscriber unit 200 may introduce other extraneous accelerations which may reduce the correlation from transmission to transmission.

In the preferred embodiment, the acceleration rate-of-change is characterized with values of $\pm 0.5$ m/s$^3$ for the overhead pass and $\pm 0.3$ m/s$^3$ for the side pass utilized. Maximum acceleration occurs when satellite 100 is directly overhead of subscriber unit 200. In the preferred embodiment, the acceleration rate of change is maximum about a minute before and after satellite 100 is directly overhead subscriber unit 200 and has a magnitude of about 0.5 m/s$^3$. This corresponds to about a 70° elevation angle.

A histogram Pa'(a'), of the acceleration rate of change may be constructed to evaluate the variance of the process.

$$E\{a'(k)a'(k)\} = \int_{-\infty}^{\infty} a'^2 P_{a'}(a')da' = 0.053 \text{ m}^2/\text{s}^3$$

Knowing the acceleration rate-of-change variance in the preferred embodiment, the covariance matrix can now be evaluated.

$$Q(k) = E\{w(k)w^T(k)\}$$

$$= E\left\{\begin{bmatrix} T^3/6 \\ T^2/2 \\ T \end{bmatrix} a'(k) \begin{bmatrix} T^3/6 \\ T^2/2 \\ T \end{bmatrix} a'(k)\right\}$$

$$= \begin{bmatrix} T^6/36 & T^5/12 & T^4/6 \\ T^5/12 & T^4/4 & T^3/2 \\ T^4/6 & T^3/2 & T^2 \end{bmatrix} E\{a'(k)a'(k)\}$$

setting T=0.36 sec (the feedback parameter loop update rate of the preferred embodiment) and using the result for the expected value of a'$^2$, the Q matrix has a value of:

$$Q(k) = \begin{bmatrix} 3.51e-6 & 2.67e-5 & 1.48e-4 \\ 2.70e-5 & 2.23e-4 & 1.24e-3 \\ 1.48e-4 & 1.24e-3 & 6.87e-3 \end{bmatrix}$$

Filter Initialization

Initial values are needed for the filter state variables (r(O), v(O), and a(O)) and the 3×3 prediction mean square error matrix P(O).

The state variables r(O) and v(O) are initialized by the range and velocity estimates determined when subscriber unit 200 is performing in synchronization mode while it is "pulling in" to meet the criterion of link parameters for communication link 105. a(O) is initialized by differencing two velocity measurements; [v(l)−v(O)]/T. Note that to initialize a(k), two measurements are needed. Since communication link 105 is now operating in Normal/Fade mode and hence, in the preferred embodiment, these measurements are about 0.36 sec apart. In subscriber unit 200, tracking loops will run without vector filter 310 until these measurements are available to the filter.

The mean square error matrix P(k) should be initialized by the variance of the initial state measurements. The P(O) matrix is given by:

$$P(O) = \begin{bmatrix} E\{r \cdot r\} & E\{r \cdot v\} & E\{r \cdot v\} \\ E\{v \cdot r\} & E\{v \cdot v\} & E\{v \cdot a\} \\ E\{a \cdot r\} & E\{a \cdot v\} & E\{a \cdot a\} \end{bmatrix}$$

where, $E\{r \cdot r\} = s_r^2$ $E\{r \cdot v\} = E\{v \cdot r\} = 0$ $E\{r \cdot a\} = E\{a \cdot r\} = 0$ $E\{v \cdot v\} = s_v^2$ $$E\{v \cdot a\} = E\{a \cdot v\} = E\left\{\frac{v_1 - v_0}{T} v_1\right\} = \frac{s_v^2}{T}$$

and, $$E\{a \cdot a\} = E\left\{\frac{v_1 - v_0}{T} \frac{v_1 - v_0}{T}\right\} = \frac{2s_v^2}{T^2}$$

Updating the matrix:

$$P(O) = \begin{bmatrix} s_r^2 & 0 & 0 \\ 0 & s_v^2 & s_v^2/T \\ 0 & s_v^2/T & 2s_v^2/T^2 \end{bmatrix}$$

To obtain the starting value for the initial synchronization, the values given in the last section are substituted for $s_r^2$ and $s_v^2$. Additionally, since the starting values are calculated over a four frame interval, T=0.36 seconds. Therefore, in the preferred embodiment, the starting value of the error covariance matrix for initial synchronization, becomes:

$$P(O) = \begin{bmatrix} 705600 & 0 & 0 \\ 0 & 34.84 & 96.78 \\ 0 & 96.78 & 537.65 \end{bmatrix}$$

Figure 6:
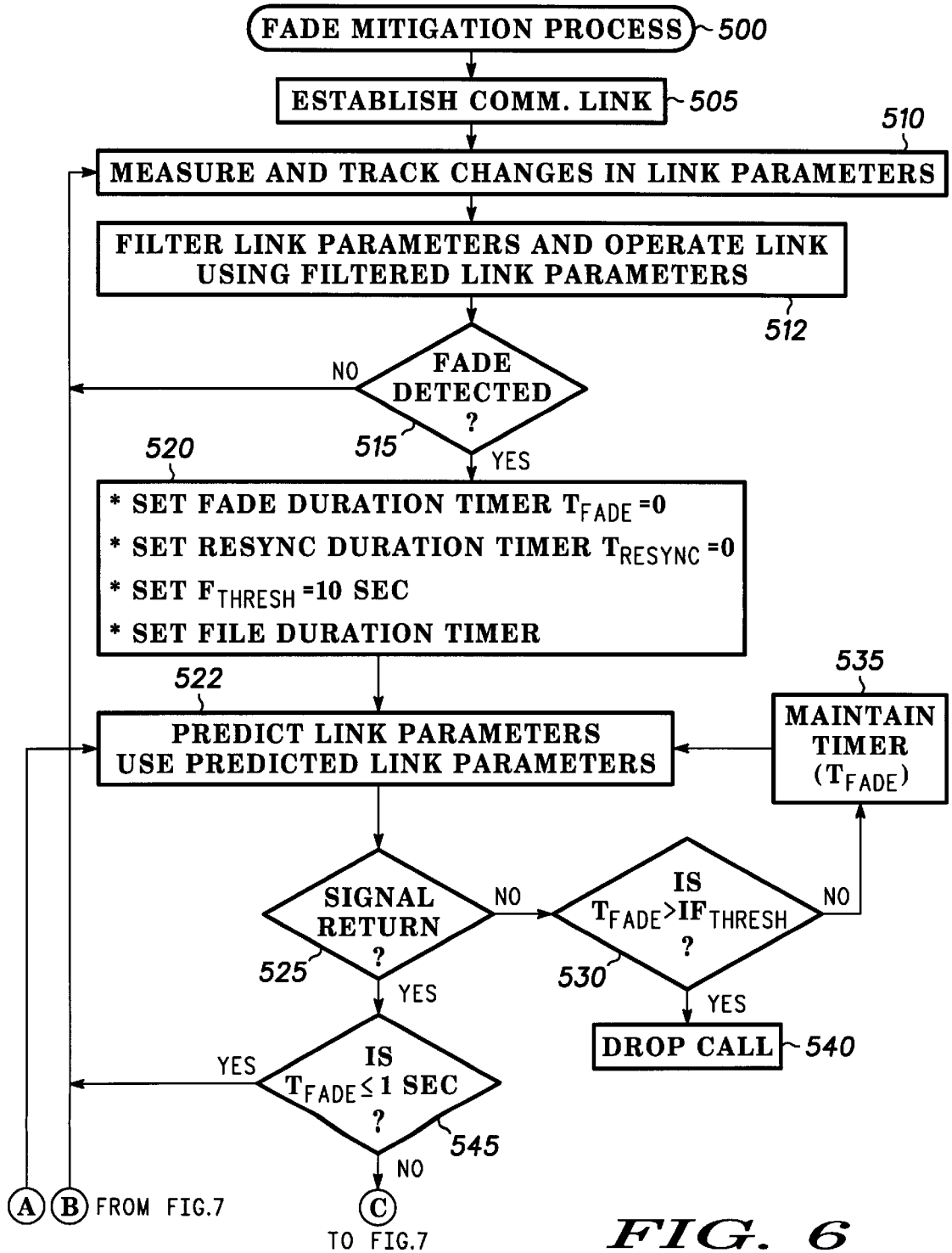
FIGS. 6 and 7 show a flowchart of a fade mitigation process for predicting dynamic communication parameters in a dynamic communication system, in accordance with a preferred embodiment of the present invention.
Figure 7:
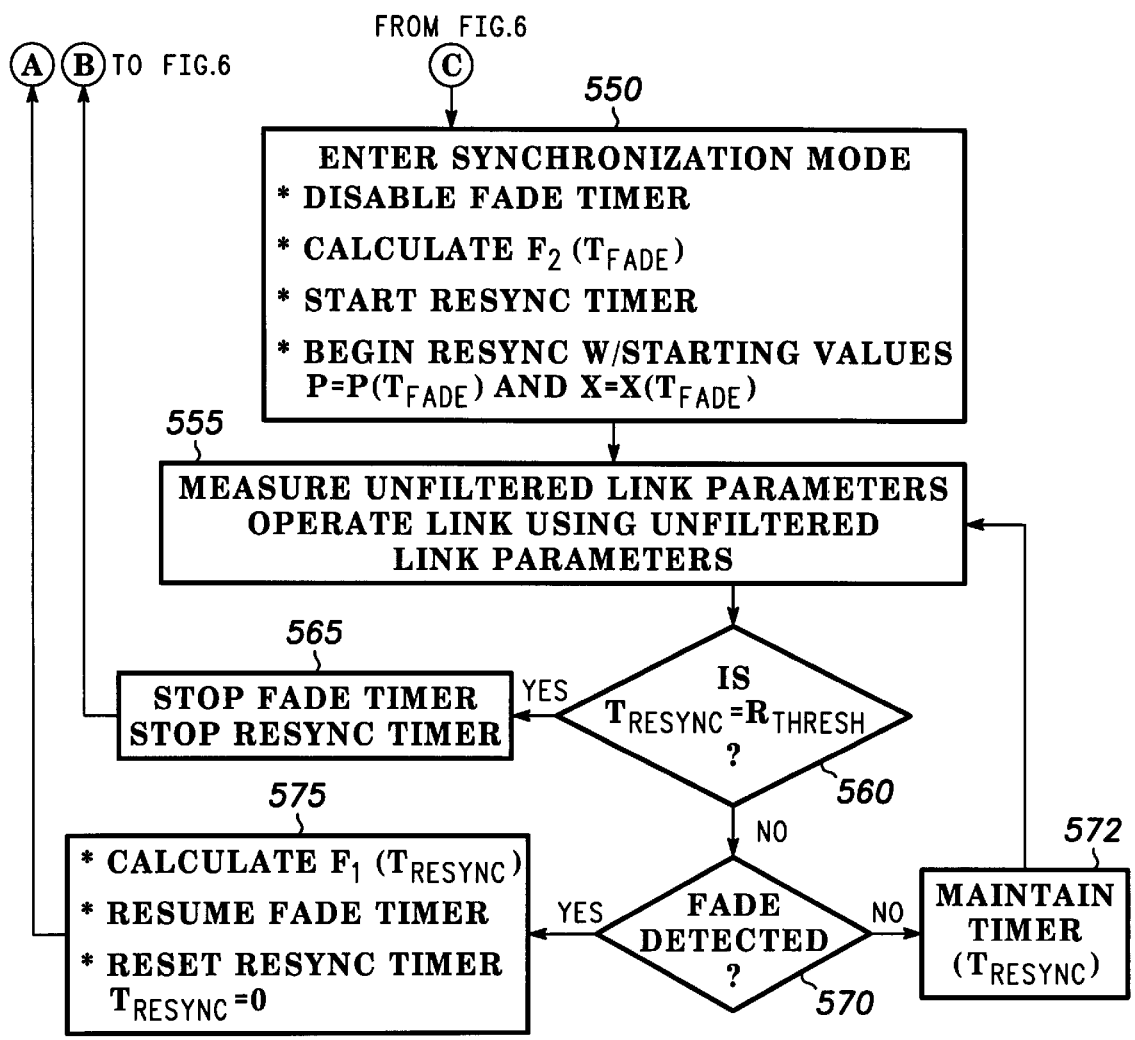

FIGS. 6 and 7 shows a flowchart of a fade mitigation process 500 for providing radio communication services between communication units using an intermittently fading, dynamically oriented, communication link 105. Process 500 is performed by subscriber unit 200.

In task 505, subscriber unit 200 conducts a call by establishing communications with satellite 100. Communication is initiated, as directed by a user of subscriber unit 200, either in response to notification that an incoming call is pending or as originated by the user. Feedback link parameters are received from satellite 100 via communication link 105. These measured feedback link parameters, in the preferred embodiment, comprise frequency and timing variances associated with transmission of data from subscriber unit 200 to satellite 100, as evaluated by satellite 100. Synchronization is complete when link parameters are sufficiently accurate that satellite 100 permits subscriber unit 200 to communicate on a tighter tolerance traffic channel. Also, synchronization is complete, in the preferred embodiment, when the matrices of vector filter 310 (FIG. 5) are initialized. If synchronization is not complete, the instantaneous, unfiltered, feedback link parameters of communication link 105 are employed for communicating with satellite 100. These measured feedback link parameters provide larger "pull-in" increments while coarse adjustment of link parameters is underway.

When synchronization is complete, subscriber unit 200 then operates in normal operating mode 160 (FIG. 2) and a task 510 measures and tracks changes in feedback link parameters. Vector filter 310 tracks these variations in link parameters in order to anticipate future changes to these parameters. While operating communication link 105, this anticipation and employment of these anticipated link parameters reduces the frequency of transmission of feedback parameters on communication link 105.

Next in task 512, the unfiltered, feedback link parameters are filtered through link parameter predictor 240. These filtered link parameters are used to operate communication link 105 to conduct a call because they are more incrementally continuous and provide a smoothing effect to link parameters employed on communication link 105.

Next, a query task 515 evaluates communication link 105 to determine if the link remains intact or if a signal fade has occurred. If a fade is not detected, subscriber unit 200 remains in normal operating mode 160 and processing returns to task 510 to track changes in any subsequent transmissions of feedback parameters to be incorporated into future predictions of link parameters.

When a signal fade is detected, subscriber unit 200 enters prediction mode 163 (see FIG. 2). During prediction mode 163, a task 520 establishes timers. Fade duration timer 231 (FIG. 3) and resynchronization duration timer 232 (FIG. 3) are each set to zero. Fade duration timer 231 measures a fade duration ($T_{fade}$) and resynchronization duration timer 232 measures a resynchronization duration ($T_{resync}$).

In task 520, a fade duration threshold $F_{thresh}$ at $T_{resync}=0$ is set to ten seconds. The fade duration threshold is a value determined by a fade duration threshold function $F_1(T_{resync})$ (discussed below). In the preferred embodiment, $F_1(T_{resync})$ has a maximum value of ten seconds when $T_{resync}=0$ and linearly decreases to zero as $T_{resync}$ extends.

The fade duration threshold, $F_{thresh}$, is a condition that determines when a channel should be dropped, as a function of resynchronization duration. In the preferred embodiment, subscriber unit 200 resets the value of resynchronization timer 232 to zero when it transitions from normal operating mode 160 to prediction mode 163 (FIG. 2). In addition, subscriber unit 200 resets the fade duration threshold $F_{thresh}$ to ten seconds, which is the maximum duration permitted for a single fade before dropping a call.

Once timers 231 and 232 (FIG. 3) are reset in task 520, fade duration timer 231 is started. A task 522 then predicts the link parameters, and these predicted link parameters are utilized to conduct a call in prediction mode 163 (FIG. 2). These link parameters are provided by link parameter-predictor 240 (FIG. 3) when link detect status 235 (FIG. 3) disables the input path and feedback tap 337 in vector filter 310 (FIG. 5) opens. Subscriber unit 200 attempts to transmit to and receive from satellite 100 using these predicted link parameters. These predicted parameters roughly track actual link parameters and will permit subscriber unit 200 to re-establish communications after the fade, so long as not too much time passes following the beginning of the fade.

Next, a query task 525 reevaluates communication link 105 to detect a recovery from the fade. If a signal is not recovered, a query task 530 compares fade duration $T_{fade}$ to the fade duration threshold, $F_{thresh}$. A task 540 proceeds when $T_{fade}$ is greater than $F_{thresh}$ and the call is dropped.

Because the prediction of subsequent link parameters has inherent error which depends on the number of stages utilized in vector filter 310, the prediction of link parameters will drift from actual values for the re-establishment of communication link 105. The call is dropped because at this point, predicted link parameters are likely to cause out-of-tolerance signals that would interfere with other calls using other channels.

Task 535 proceeds when fade duration $T_{fade}$ is less than fade duration threshold value, $F_{thresh}$. Task 535 maintains or updates fade timer 231 to time a fade duration. After task 535, program control loops back to task 522, and subscriber unit 200 continues to operate using predicted link parameters. This iterative prediction of subsequent parameters may continue until the fade ends or until $T_{fade}>F_{thresh}$.

When re-establishment of communication link 105 is detected in query task 525, fade duration is evaluated in a query task 545. If fade duration $T_{fade}$ is less than or equal to one second, subscriber unit 200 will resume normal operation and continue as if the fade had not occurred. In other words, subscriber unit 200 will return directly to normal operating mode 160 (FIG. 2) without first transitioning through resynchronization mode 165 (FIG. 2). Program control returns to task 510 to measure and track changes in subsequent transmissions of feedback link parameters to be incorporated into future predictions of link parameters.

In query task 545, if the signal returns after the fade has lasted more than one second, the predicted link parameters have become suspect due to the extensive lack of measured data. Therefore, process 500 proceeds to a task 550 where subscriber unit 200 enters resynchronization mode 165 (FIG. 2).

In task 550, fade timer 231 is stopped or otherwise disabled, and a resynchronization time threshold $R_{thresh}$ for completing resynchronization and returning to normal operating mode 160 (FIG. 2) is calculated based on fade duration $T_{fade}$. The resynchronization time threshold $R_{thresh}$ is a condition determined by the resynchronization duration threshold function, $F_2(T_{fade})$. This function, $F_2(T_{fade})$ defines the resynchronization interval, and is a mathematical algorithm that increases the resynchronization interval as the timed fade duration increases. In the preferred embodiment, an interval of 4.5 seconds is adequate to fully resynchronize filter 310 (FIG. 5) from a "cold start." On the other hand, no resynchronization is needed when $T_{fade}$ is less than or equal to approximately one second. Finally, under worst case conditions, vector filter 310 will completely lose the link parameters after a fade of 10 seconds. Assuming for design simplicity that a linear function is adequate, these parameters allow the following formula to be derived for $F_2(T_{fade})$:

$$F_2(T_{fade})=0.5(T_{fade})-0.5 \text{ seconds } T_{fade} \geq 1 \text{ second}$$

In task 550, resynchronization timer 232 is started to time resynchronization duration. If another fade is detected in resynchronization mode 165, subscriber unit 200 will re-enter prediction mode 163, as shown in state diagram 175 (FIG. 2) (discussed below). At that point, the resynchronization duration Tresync will then be used to calculate the fade duration threshold value for dropping a channel.

To avoid unnecessarily tying up channels, satellite 100 (FIG. 1) will drop the call unless a signal is received at least once in 10 seconds. Thus, in task 550, subscriber unit 200 transmits a maintenance burst as soon as it enters resynchronization mode 165. This will prevent satellite 100 from dropping communication link 105 (FIG. 1) when subscriber unit 200 is in an extended series of fade/resynchronization cycles.

In task 550, subscriber unit 200 next resynchronizes Kalman-type filter 310 (FIG. 4) which has a prediction mean square error matrix data structure and state variables that instantiate prediction mean square error matrix data structure and state variables. This data structure has a plurality of elements, wherein each of these elements has a characteristic initial covariance value and a steady state covariance value. Now, however, the starting state vector, x(0), and the starting value of the covariance matrix, P(0), depend on the timed fade duration $T_{fade}$. In other words, starting values are determined for each of the elements in the prediction mean square error matrix data structure, between the initial covariance value and the steady state covariance value in response to fade duration $T_{fade}$. This determination is made by a linear function that increases (or decreases) each covariance value on a slope set by the difference between the initial and the steady state covariance values, and the ten second interval determined to be the duration to reset the covariance matrix to its initial values. However, those skilled in the art may devise other curve-fitting or interpolating techniques for obtaining appropriate starting values.

So, the threshold functions $F_1(T_{resync})$ and $F_2(T_{fade})$, along with the starting value functions $P(T_{fade})$ and $x(T_{fade})$ adjust the process timing in accordance with how long the signal was interrupted. Basically, the longer the fade duration, the larger the errors in the filter's estimates of link parameters and the longer the time required to resynchronize the filter once the signal returns. Also, the longer vector filter 310 remains in resynchronization mode 165 (FIG. 2), the longer the subscriber unit's predicted link parameters will remain in tolerance if another fade occurs before it is necessary to drop the channel. If the fade duration is relatively short, the filter estimates remain fairly accurate, and the resynchronization interval defined as $F_2(T_{fade})$ can be minimized.

Following task 550 in resynchronization mode 165, a task 555 measures and tracks the feedback link parameters. These measured, unfiltered, instantaneous link parameters are provided to conduct a call in resynchronization mode 165 and communication link 105 is operated in response to these unfiltered link parameters.

Next, a query task 560 compares resynchronization duration, $T_{resync}$, provided by resynchronization duration timer 232 (FIG. 3) with the resynchronization time threshold $R_{thresh}$ for returning to normal operation, calculated above in task 550. When the duration to complete resynchronization $T_{resync}$ equals resynchronization time threshold $R_{thresh}$, resynchronization has been performed so as to completely resynchronize the link-parameter predicting model 240 (FIG. 3) and program control proceeds to a task 565.

Task 565 stops fade duration and resynchronization duration timers 231 and 232 respectively. At this point, subscriber unit 200 enters normal operating mode 160 (FIG. 2) and program control returns to task 510 to track changes in any subsequent transmissions of feedback parameters to be incorporated into future predictions of link parameters.

At query task 560, while $T_{resync}$ is less than resynchronization time threshold $R_{thresh}$, subscriber unit 200 remains in resynchronization mode 165 (FIG. 2) and program control proceeds to a query task 570. Query task 570 evaluates communication link 105 (FIG. 1) for subsequent fades. If a fade is not detected, program control proceeds to a task 572 where the resynchronization duration timer 232 times the duration of resynchronization, and the degree of completion toward resynchronization of the vector filter 310 is measured. The measurement provides degrees of completion from a substantially constant initial condition. In other words, each time subscriber unit 200 enters prediction mode 163 (FIG. 2) resynchronization duration timer 232 begins timing from an initial reset condition. Program control then loops back to task 555 where subscriber unit 200 continues to maintain the communication link 105 using the unfiltered link parameters.

If a fade is detected at query task 570 during resynchronization mode 165, a task 575 calculates the fade duration threshold for dropping a channel $F_{thresh}$ based on the resynchronization time. The fade duration threshold for dropping a channel $F_{thresh}$ is a value determined by the fade duration threshold function, $F_1(T_{resync})$. The function $F_1(T_{resync})$ is a mathematical algorithm that increases the time that the channel can be maintained after the subscriber unit 200 has an opportunity to partially resynchronize the filter. This occurs when the signal returns for a short time following a fade. In other words, $F_{thresh}$ increases as the degree of completion of resynchronization increase. In the preferred embodiment, the time that the subscriber unit remains in synchronization increases approximately linearly with the length of time the link is available to provide measurements to the filter. Accordingly, the following formula is derived for $F_1(T_{resync})$:

$$F_1(T_{resync}) \text{ sec} = 4.09 \text{ sec/frame } (T_{resync} \text{ frames}) - 24.5 \text{ sec}$$

Next, task 575 resumes or enables the previously disabled fade duration timer 231, accumulating a duration over a pluralit of fades, and resynchronization duration timer 232 is reset to zero. Program control then loops back to task 522, and subscriber unit 200 re-enters prediction mode 163 (FIG. 2). This iterative process is repeated for each of a plurality of fades until the system is completely resynchronized and returns to normal operating mode 160, or until the subscriber unit 200 drops the channel because the measured fade duration $T_{fade}$ exceeds the fade duration threshold $F_{thresh}$.

In summary, the present invention has utility in conducting a call using intermittently fading communication links and maintaining synchronization between a satellite and a subscriber unit during link blockages such as those due to highway bridges, tunnels, or other blocking structures. In addition, synchronization of the system and the decision to drop a call is based on actual conditions rather than worst case conditions. This technique better allows a subscriber unit to remain in synchronization with a channel as long as the channel eventually recovers, thus foregoing a need to establish a subsequent communication link.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of providing radio communication services between communication units using an intermittently fading, dynamically oriented, communication link, said method comprising the steps of:

(a) conducting a call using a communication link in which link parameters change throughout said call;

(b) tracking changes in said link parameters using a link parameter-predicting model, said tracking step further comprising the steps of:

(b1) measuring and tracking changes in said link parameters to provide unfiltered link parameters;

(b2) filtering said unfiltered link parameters, using said link parameter-predicting model, to provide filtered link parameters;

(b3) operating said link in response to said filtered link parameters;

(c) detecting a fade in said link, said detecting step further comprising the steps of:

(c1) predicting said link parameters during said fade using said link parameter-predicting model, said predicting step providing predicted link parameters;

(c2) operating said link in response to said predicted link parameters during said fade;

(d) timing a duration for said fade;

(e) detecting recovery from said fade; and (f) resynchronizing, after recovering from said fade, said link parameter-predicting model using starting values that are responsive to said fade duration timed in said step (d), and operating said link in response to said unfiltered link parameters during said resynchronizing step.

2. A method as claimed in claim 1 additionally comprising the step of dropping said call if said fade duration timed in said step (d) becomes greater than a first duration.

3. A method as claimed in claim 2 additionally comprising the step of calculating said first duration upon detecting said fade in said step (d).

4. A method as claimed in claim 3 wherein:

said step (f) comprises the step of measuring degrees of completion toward resynchronizing said link parameter-predicting model; and said calculating step comprises the step of applying a mathematical algorithm which increases said first duration as said degrees of completion toward resynchronizing said link parameter-predicting model increase.

5. A method as claimed in claim 4 wherein said measuring step comprises the step of timing a duration during which said step (f) is performed.

6. A method as claimed in claim 4 wherein:

said steps (c), (d), (e), and (f) are repeated for each of a plurality of fades; and said measuring step measures said degrees of completion from a substantially constant initial condition for each repetition of said step (f).

7. A method as claimed in claim 1 additionally comprising the steps of:

tracking said link parameters during said step (f) to provide unfiltered link parameters;

operating said link in response to said unfiltered link parameters during said step (f);

measuring degrees of completion toward resynchronizing said link parameter-predicting model during said step (f);

filtering said unfiltered link parameters following completion of said step (f), to provide filtered link parameters; and operating said link in response to said filtered link parameters following completion of said step (f).

8. A method as claimed in claim 7 additionally comprising the step of calculating a condition wherein an occurrence of said condition defines the completion of said step (f).

9. A method as claimed in claim 8 wherein:

said condition at which said step (f) will be complete is the passage of a first duration;

said measuring step comprises the step of timing a resynchronization duration for which said step (e is performed;

said calculating step applies a mathematical algorithm which increases said first duration as said fade duration timed in said step (d) increases.

10. A method as claimed in claim 9 wherein:

said steps (c), (d), (e), and (f) are repeated for each of a plurality of fades; and said method additionally comprises the step of determining whether said step (f) has been performed so as to completely resynchronize said link parameter-predicting model;

accumulating said duration timed in said step (d) over said plurality of fades until said step (f) becomes complete.

11. A method as claimed in claim 1 wherein:

said link parameter-predicting model comprises a Kalman-type filter having a prediction mean square error matrix data structure and state variables; and said starting values instantiate said prediction mean square error matrix data structure and said state variables.

12. A method as claimed in claim 11 wherein:

said prediction mean square error matrix data structure has a plurality of elements, and each of said elements has a characteristic initial covariance value and a steady state covariance value; and said step (f) comprises the step of determining, for each of said elements, said starting values between said initial covariance value and said steady state covariance value in response to said fade duration timed in said step (d).

13. A method of providing radio communication services between communication units using an intermittently fading communication link, said method comprising the steps of:

(a) conducting a call using said communication link;

(b) detecting, during said step (a), recovery of said communication link from a first fade;

(c) resynchronizing a link parameter-predicting model upon recovery from said first fade;

(d) measuring, during said step (c), degrees of completion toward resynchronizing said link parameter-predicting model;

(e) detecting a second fade during said resynchronizing step (c);

(f) calculating a drop duration which increases as said degrees of completion toward resynchronizing said link parameter-predicting model increase; and (g) dropping said call if said second fade continues for said drop duration.

14. A method as claimed in claim 13 wherein said step (d) comprises the step of timing a duration during which said step (c) is performed.

15. A method as claimed in claim 13 wherein:

said method additionally comprises the step of timing a duration for said first fade; and said step (c) comprises the step of using starting values that are responsive to said fade duration timed in said timing step.

16. A method as claimed in claim 13 additionally comprising the step of calculating a condition wherein an occurrence of said condition defines completion of said step (c).

17. A method as claimed in claim 16 wherein:

said method additionally comprises the step of timing a fade duration for said first fade;

said condition which defines completion of said step (c) is passage of a first duration;

said measuring step (d) comprises the step of timing a resynchronization duration for which said step (c) is performed; and said calculating step applies a mathematical algorithm which increases said first duration as said fade duration timed in said timing step increases.

18. A method as claimed in claim 13 wherein said step (a) comprises the steps of:

tracking link parameters prior to said first fade and during said resynchronizing step (c), said tracking step providing unfiltered link parameters;

filtering said unfiltered link parameters prior to said first fade using said link parameter-predicting model, said filtering step providing filtered link parameters;

operating said link in response to said filtered link parameters prior to said first fade;

predicting said link parameters during said first fade using said link parameter-predicting model, said predicting step providing predicted link parameters;

operating said link in response to said predicted link parameters during said first fade; and operating said link in response to said unfiltered link parameters during said step (c).

19. A method of managing a call between communication units using an intermittently fading radio communication link in which link parameters change throughout said call, said method comprising the steps of:

(a) conducting said call in a normal operating mode wherein said link is operated in response to filtered link parameters, said filtered link parameters being filtered through a link parameter-predicting model, and wherein a fade duration timer is reset;

(b) detecting one or more fades in said link;

(c) conducting, in response to said step (b), said call in a prediction mode wherein said link is operated in response to predicted link parameters, said predicted link parameters being predicted by said link parameter-predicting model, said fade duration timer is enabled and times a duration of said fade, and a resynchronization duration timer is reset;

(d) detecting recovery from said fade;

(e) conducting, in response to said step (d), said call in a resynchronization mode wherein said link is operated in response to unfiltered link parameters, said link parameter-predicting model is resynchronized, said fade duration timer is disabled, and said resynchronization duration timer times a duration of resynchronization for said link parameter-predicting model;

(f) dropping said call if said fade duration timer indicates a drop time, said drop time being determined in response to a time indicated by said resynchronization duration timer;

(g) detecting completion of said resynchronization mode, said completion occurring when said resynchronization duration reaches a resynchronization threshold time, said resynchronization threshold time being determined in response to said fade duration; and (h) conducting said call in said normal operating mode in response to said step (g).

20. A method as claimed in claim 19 wherein said step (d) comprises the step of determining starting values for said link parameter-predicting model, said starting values being determined in response to said fade duration.

21. A method as claimed in claim 20 wherein:

said link parameter-predicting model is a Kalman-type filter having a prediction mean square error matrix data structure and state variables; and said starting values instantiate said prediction mean square error matrix data structure and said state variables.

22. A method as claimed in claim 21 wherein:

said prediction mean square error matrix data structure has a plurality of elements, and each of said elements has an initial covariance value and a steady state covariance value; and said step (d) comprises the step of determining, for each of said elements, said starting values between said initial covariance value and said steady state covariance value in response to said fade duration.

23. A subscriber unit adapted to conduct a call using a communication link in which link parameters change throughout said call, said subscriber unit comprising:

means for detecting a fade in said communication link;

means for tracking changes in said link parameters using a link parameter-predicting model, said means for tracking further comprising means for measuring said link parameters to provide unfiltered link parameters, means for filtering said unfiltered link parameters to provide filtered link parameters, means for operating said communication link in response to said filtered link parameters;

means for detecting a fade in said communication link, said means for detecting further comprising means for predicting said link parameters during said fade using said link parameter-predicting model, means for operating said link in response to said predicted link parameters during said fade;

means for timing a duration for the fade;

means for detecting recovery from the fade; and means for resynchronizing, after recovering from the fade, said link parameter-predicting model using starting values that are responsive to the time of the fade duration.

24. A subscriber unit as recited in claim 23, further comprising means for dropping said call if said fade duration becomes greater than a first duration.

25. A subscriber unit as recited in claim 23, further comprising means for measuring degrees of completion toward resynchronizing said link parameter-predicting model.

* * * * *

UNITED STATES PATENT AND TRADEMARK OFFICE
CERTIFICATE OF CORRECTION

PATENT NO.   : 5,926,767
DATED        : JULY 20, 1999
INVENTOR(S)  : Olds et al.

It is certified that error appears in the above-identified patent and that said Letters Patent is hereby corrected as shown below:

Column 16, line 28, change "pluralit" to --plurality--.

Column 17, line 63, claim 9, change "(e" to --(f)--

Signed and Sealed this

First Day of February, 2000

Attest:

Q. TODD DICKINSON

*Attesting Officer*          *Acting Commissioner of Patents and Trademarks*